United States Patent [19]

Gray et al.

[11] 3,853,731

[45] Dec. 10, 1974

[54] SOLID STATE JUNCTION GLASS ELECTRODE AND METHOD OF MAKING SAID ELECTRODE

[75] Inventors: Don N. Gray, Sylvania; Chung-Chang Young, Toledo, both of Ohio

[73] Assignee: Owens-Illinois, Inc., Toledo, Ohio

[22] Filed: Mar. 12, 1973

[21] Appl. No.: 339,743

[52] U.S. Cl. ................ 204/195 G, 29/570, 29/576, 29/592
[51] Int. Cl. ............................................ G01n 27/36
[58] Field of Search ............ 204/195 G, 1 T; 29/570, 29/576, 592

[56] References Cited
UNITED STATES PATENTS

| | | | |
|---|---|---|---|
| 3,282,817 | 11/1966 | Riseman et al. | 204/195 G |
| 3,306,837 | 2/1967 | Riseman et al. | 204/195 G |
| 3,481,855 | 12/1969 | Kolodney et al. | 204/195 S |
| 3,607,710 | 9/1971 | Farren et al. | 204/195 M |
| 3,619,381 | 11/1971 | Fitterer | 204/1 T |
| 3,649,506 | 3/1972 | Petersen et al. | 204/195 G |

*Primary Examiner*—G. L. Kaplan
*Attorney, Agent, or Firm*—Richard D. Heberling; E. J. Holler

[57] ABSTRACT

An ion selective glass electrode having a solid state junction which does not require an internal filling solution is fabricated by applying a film of a mixture of silver oxide and a silver salt of a hologen oxy acid to the inside surface of a glass electrode and firing at an elevated temperature. The mixture is thereby converted to a composite of silver and silver halide and fused to the ion selective glass surface. Attachment of a wire to the surface of the resulting composite establishes electrical contact with the inside of the electrode.

17 Claims, 2 Drawing Figures

SOLID STATE JUNCTION GLASS ELECTRODE AND METHOD OF MAKING SAID ELECTRODE

BACKGROUND OF THE INVENTION

Electrodes for determining the activity of ions in solution have been known for some time. Glass electrodes for measuring pH have largely replaced the hydrogen and quinhydrone electrodes. Other glass electrodes may be used to determine $Li^+$, $Na^+$, $K^+$, $Rb^+$, $Cs^+$, $NH_4^+$, $Ag^+$, $Tl^+$, $Mg^{2+}$, $Ca^{2+}$, $Sr^{2+}$, $Ba^{2+}$ and organic cations.

The usual construction of such glass electrode consists of a membrane of ion selective glass affixed to a glass electrode body which contains an internal reference half cell such as a silver-silver chloride half cell. The internal reference half cell contains a liquid electrolyte such as a potassium chloride solution and a wire immersed in the electrolyte such as a silver wire coated with silver chloride. The wire is connected in an external circuit through a potential measuring means to a reference electrode such as a saturated calomel electrode which contacts the solution in which the glass electrode is immersed and in which the unknown ion activity is to be determined.

Such electrodes have had to be carefully constructed and positioned in order to avoid loss of the internal electrolyte and to insure that the electrolyte properly contacts the wire immersed therein.

An electrode capable of sensing a particular ion or ions in solution which did not require an internal liquid electrolyte would prove advantageous and satisfy a need for a more easily fabricated and more versatile electrode.

A number of approaches toward this end have been made. A copper (I) sulfide ceramic membrane electrode useful for measuring the activity of copper (II) ions in solution in which a wire is attached directly to the membrane has been described. Hiroshi Hirata, Kenji Higashiyama and Kenji Date, Anal. Chim. Acta 51, 209 (1970). A glass pH electrode having a thin layer of ion sensitive glass fused to an oxidized copper electrode is disclosed in U.S. Pat. No. 3,498,901 to L. T. Metz et al.

However, neither of these approaches satisfies the need for an easily fabricated ion selective glass electrode.

It is accordingly an object of this invention to provide a novel improved solid state junction electrode.

Another object of this invention is to fabricate an ion selective glass electrode which can be used in any position.

A further object of this invention is to provide such an electrode which is easily fabricated.

A still further object of this invention is to provide an ion selective electrode which can be fabricated in any desired size or shape.

Other objects and advantages of this invention will become apparent from the following detailed disclosure and description.

SUMMARY OF THE INVENTION

An ion selective glass electrode having a solid state junction between the internal reference half cell and the ion selective glass membrane of the sensing head can be fabricated using a mixture of silver oxide, $Ag_2O$ and a silver salt of a halogen oxy acid in which the halogen is present in one of its higher valences, for example silver chlorate, $AgClO_3$.

The mixture is applied to the inside surface of the ion selective glass membrane and fired at an elevated temperature to produce a composite of silver and silver halide, for example, a composite of silver and silver chloride, fused to the glass membrane. A wire is then attached to the surface of the composite for making a connection in an external electrical circuit.

The resulting electrode is characterized by having a constant junction potential which can be set by the choice of mixture used to form the composite and firing and other conditions under which the electrode is fabricated. Such electrode can be connected through a potential measuring device such as a potentiometer or voltmeter to a reference electrode such as a saturated calomel electrode and used to determine the activity of the ion to which the glass sensing head is sensitive.

DESCRIPTION OF THE DRAWING

Referring to FIG. 1 a glass electrode body 10 in generally cylindrical form has fused to the end thereof an ion selective glass membrane 11 which closes the end of the cylinder. Inside the cylinder and adjacent the end thereof is silver-silver halide composite 12 which may, for example, be a composite of silver and silver chloride. Wire 13 is attached to composite 12 by means of seal 14 which may be formed from a silver epoxy cement. Wire 13 can be made of platinum or other conductive metal and is contained in cable 15 which extends beyond electrode body 10 for making an appropriate external electrical connection. Packing material 16, which may be a potting compound, fills the remaining space within electrode body 10.

In FIG. 2 another embodiment of the electrode of this invention is shown in which a glass electrode body 20 in generally cylindrical shape has fused to the lower end thereof an ion selective glass sensing head 21. Silver-silver halide composite 22 is fused to the inside surface of sensing head 21 and has copper wire 23 attached thereto by means of seal 24. Cable 25 extends from wire 23 outside of electrode body 20 for making an electrical connection to an external circuit. Packing material 26 fills the remainder of electrode body 20.

DESCRIPTION OF THE PREFERRED EMBODIMENTS

Figure 1:
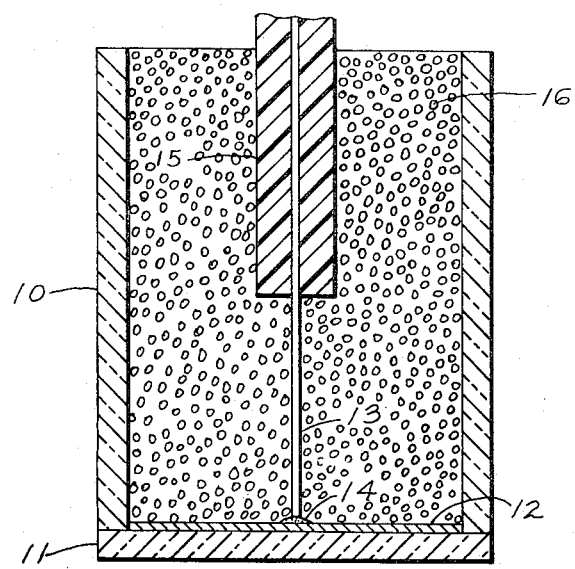
FIG. 1 is a vertical sectional view of one embodiment of the ion selective glass electrode of this invention.
Figure 2:
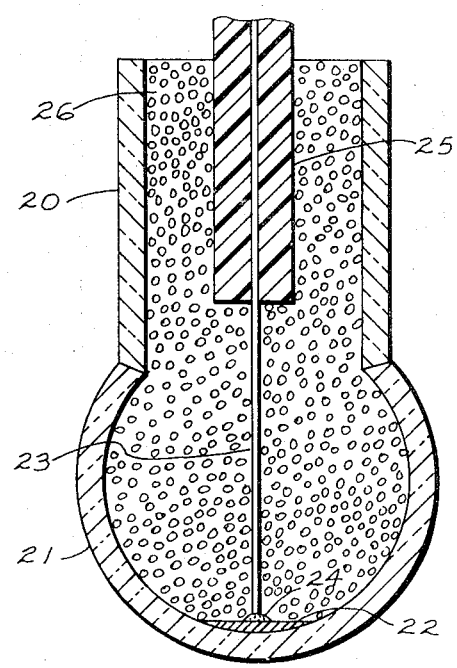
FIG. 2 is a vertical sectional view of another embodiment of the ion selective glass electrode of this invention.

The silver-silver halide composite which is fused to the ion selective glass sensing head can be formulated in a number of different ways depending upon the characteristics desired for the electrode incorporating the composite.

In general silver oxide is mixed with a silver salt of a halogen oxy acid in which the halogen is present in one of its higher valence states, for example, silver chlorate, $AgClO_3$, silver perchlorate, $AgClO_4$, silver bromate, $AgBrO_3$, or silver iodate, $AgIO_3$. Other salts which can be used include silver hypochlorite, $AgClO$ and silver chlorite, $AgClO_2$ as well as the corresponding oxy acid silver salts of bromine and iodine.

The mixture of oxide and halogen oxy acid salt may contain a majority of either ingredient depending upon the junction potential desired. A greater proportion of halogen oxy acid salt results in a more negative junction potential. As little as about 0.1 percent by weight of either ingredient may be used if desired although at least about 10 percent is preferred.

Although the mixture of oxide and halogen oxy acid may be used without any binder or filler, in an especially preferred embodiment of this invention a glass binder is used to further facilitate the fabrication of the electrode and to provide desired properties including enhanced strength and durability.

For this purpose any low melting powdered glass can be used, for example, Owens-Illinois SG-67 solder glass.

The glass can be added to the mixture of oxide and halogen oxy acid salt in an amount such that it constitutes from about 10 percent to 50 percent of the mixture. About 20 percent to 40 percent is preferred.

For application to the ion selective glass surface a paste is prepared by mixing the above described solid ingredients in a suitable inert organic vehicle such as a solution of an acrylic resin. The viscosity of the paste needed will depend upon the method of application to the ion selective glass surface. One such suitable vehicle comprises one part acrylic resin, three parts diisobutyl adipate and 5 percent by weight of ethylene glycol.

The paste can be applied to the interior surface of the ion selective glass by brushing or by using a conventional thick film printing technique to screen print the paste on to the glass surface in the thickness desired. Ordinarily thick film printing results in a film about 0.001 inch thick following firing. However, for the purposes of this invention a thicker or thinner film may be produced. In general a thickness of about 0.003 inch to 0.030 inch is desired.

Following application of the paste to the ion sensitive glass surface the electrode is fired at a temperature of about 400°C. to 650°C. for a period of time of about ¼ hour to 1 hour.

This treatment results in converting the mixture of silver oxide and silver salt of a halogen oxy acid into a silver-silver halide composite which is fused to the inside surface of the ion selective glass membrane.

A metal conductor such as a wire is then connected to the surface of the resulting composite to complete the internal reference half cell.

For this purpose a copper wire, for example, can be cemented to the composite surface by use of an electrically conductive adhesive such as a silver epoxy cement.

The invention will be better understood by reference to the following detailed examples which are intended to illustrate the instant invention without placing any unnecessary limitations thereon.

EXAMPLE 1

A mixture of 3.0 g. silver oxide and 0.3 g. silver perchlorate was formed into a thick paste using a mixture of 50 g. ELVACITE acrylic resin and 150 g. diisobutyl adipate with 5 percent by weight ethylene glycol.

The paste was applied to the inner surface of a pH glass electrode and the coated glass electrode was then placed in a furnace. The temperature was slowly raised to 520°C. at the rate of about 25°C. per minute and held at 520°C. for one hour. The furnace was then shut off and the electrode allowed to cool to room temperature.

A copper wire was attached to the resulting silver-silver chloride coating on the inner surface of the glass electrode using ECCOBOND V91 silver epoxy cement.

The resulting electrode gave a reading of −134 mv. vs. a silver-silver chloride reference electrode in a pH 7 buffer solution.

EXAMPLE 2

The procedure of Example 1 was repeated except that 1.8 g. of Owens-Illinois SG-67 solder glass having the composition shown in Table 1 was included in the paste.

A reading of +20 mv. was obtained.

TABLE 1

|  | % |
|---|---|
| $SiO_2$ | 3 |
| $B_2O_3$ | 16 |
| $Al_2O_3$ | 3 |
| $Sb_2O_3$ | 3 |
| PbO | 62 |
| ZnO | 9 |
| CuO | 4 |

The electrodes of this invention are versatile, convenient and relatively durable. They can be readily fabricated in any desired configuration and can be furnished in any size needed including miniature sizes, which could not readily be provided using the standard glass electrode with the internal liquid electrolyte of the prior art. They can also be used in any position including upside down, since there is no danger of spilling a liquid electrolyte.

We claim:

1. A glass electrode having a solid-state junction which comprises an electrode body, a membrane of ion-selective glass closing one end of said body, a silver-silver halide composite directly fused to the inside surface of said membrane, the composite being a reaction product of a mixture of:
   a. at least about 0.1 percent by weight of the mixture of silver oxide; and
   b. at least about 0.1 percent by weight of the mixture of a silver salt of a halogen oxy acid, the mixture being heated to a temperature of about 400°–650°C., and means for connecting said composite to an external electrical circuit.

2. An electrode according to claim 1 wherein said composite is a silver-silver chloride composite.

3. An electrode according to claim 1 wherein said composite is a silver-silver bromide composite.

4. An electrode according to claim 1 wherein said composite is a silver-silver iodide composite.

5. An electrode according to claim 1 wherein the composite contains about 10–50 percent by the weight of the mixture of a glass binder.

6. An electrode according to claim 1 wherein said means is a metal conductor.

7. An electrode according to claim 1 wherein said means is attached to said composite by an electrically conductive adhesive.

8. An electrode according to claim 1 wherein said means is a copper wire that is attached to said composite by silver epoxy cement.

9. An electrode according to claim 1 in which the composite contains a glass having the following formulation in approximate weight by percent:

| Ingredient | Weight Percent |
|---|---|
| $SiO_2$ | 3 |
| $B_2O_3$ | 16 |
| $Al_2O_3$ | 3 |
| $Sb_2O_3$ | 3 |
| PbO | 62 |
| ZnO | 9 |
| CuO | 4 |

10. A process for producing a glass electrode having a solid state junction which comprises applying to the inside surface of an ion selective glass membrane closing one end of an electrode body a paste comprising a mixture of silver oxide and a silver salt of a halogen oxy acid in an inert vehicle therefor, firing at a temperature and for a period sufficient to convert the paste to a silver-silver halide composite and to fuse said composite to said membrane and attaching electrical connection means to said composite.

11. A process according to claim 10 wherein said salt is silver chlorate.

12. A process according to claim 10 wherein said salt is silver perchlorate.

13. A process according to claim 10 wherein said salt is silver bromate.

14. A process according to claim 10 wherein said salt is silver iodate.

15. A process according to claim 10 wherein said vehicle comprises a solution of an acrylic resin.

16. A process according to claim 10 wherein said paste contains powdered glass.

17. A process according to claim 10 wherein firing is accomplished at a temperature of about 400°C. to 650°C. for a period of time of about ¼ hour to 1 hour.

* * * * *